US006230949B1

(12) United States Patent
O'Connell et al.

(10) Patent No.: US 6,230,949 B1
(45) Date of Patent: May 15, 2001

(54) VEHICLE JACK AND TOOL ASSEMBLY

(75) Inventors: Daniel M O'Connell, Linden; Harold B Thibodeau, Madison Heights; Chris E Ralko, White Lake, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/431,324

(22) Filed: Nov. 2, 1999

(51) Int. Cl.[7] ........................................................ B60R 11/06
(52) U.S. Cl. ............................ 224/557; 206/349; 206/373; 224/543
(58) Field of Search .......................... 206/349, 372, 206/373, 223; 224/522, 539, 543, 545, 555, 557; 254/93 H

(56) References Cited

U.S. PATENT DOCUMENTS

| 2,649,191 | 8/1953 | McLaughlin . | |
|---|---|---|---|
| 2,699,865 | 1/1955 | Bowin . | |
| 3,158,284 | * 11/1964 | Henchert et al. | 220/755 |
| 3,513,969 | 5/1970 | Roff . | |
| 4,750,774 | 6/1988 | Pickering . | |
| 4,846,346 | * 7/1989 | Kime | 206/372 |
| 5,085,406 | 2/1992 | Schmaltz . | |
| 5,288,000 | * 2/1994 | Adamson | 224/522 |
| 5,520,400 | 5/1996 | Hung . | |
| 5,894,974 | 4/1999 | Jensen . | |
| 5,947,356 | * 9/1999 | Delong | 224/557 |

* cited by examiner

Primary Examiner—Jim Foster
(74) Attorney, Agent, or Firm—Marc Lorelli

(57) ABSTRACT

A vehicle jack and tool assembly is provided. The assembly includes a body member having a handle and means to connect a vehicle jack, lug nut wrench, and a plurality of jack handles thereto. The body member also includes an attachment mechanism for selectively engaging said assembly to a vehicle.

22 Claims, 5 Drawing Sheets

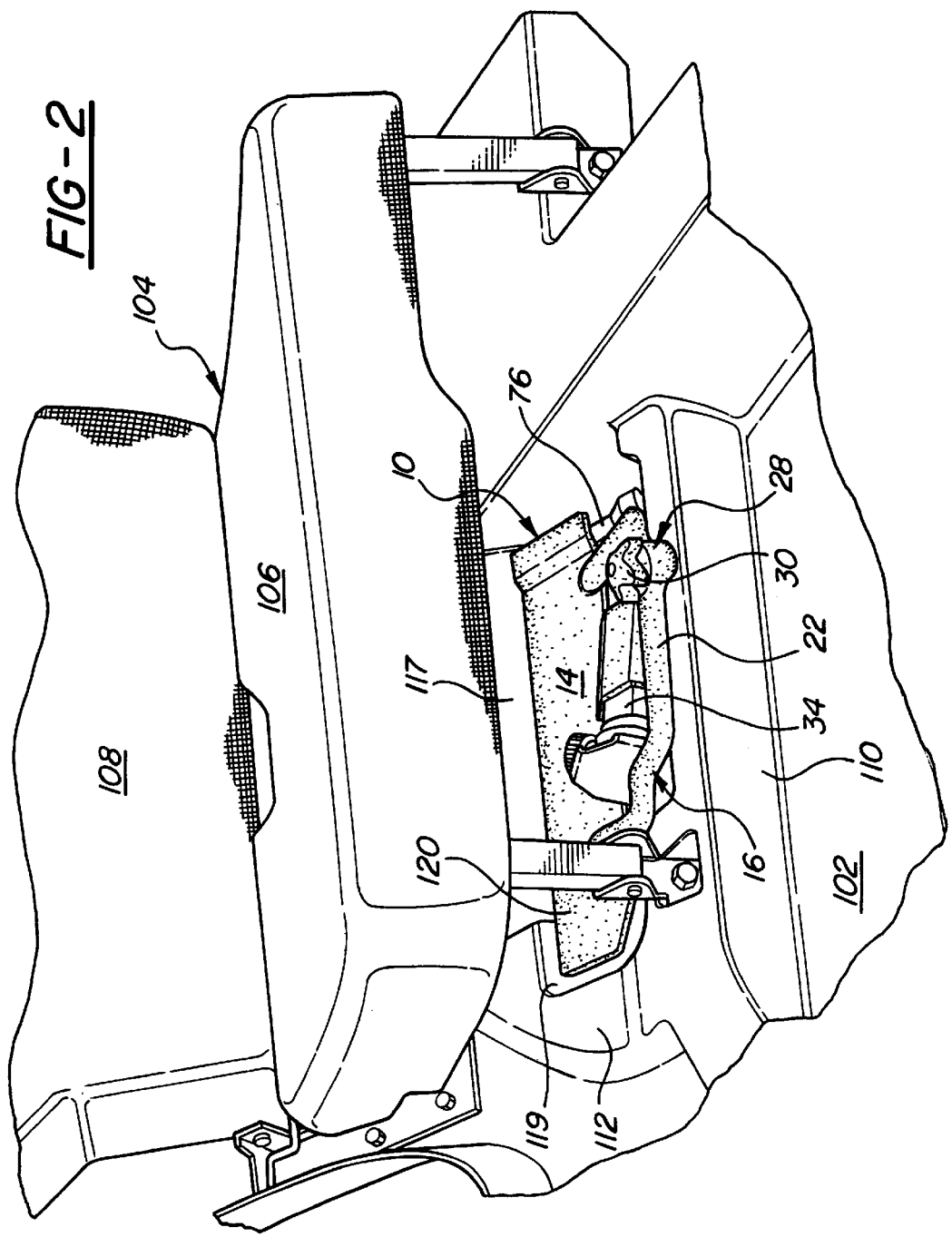

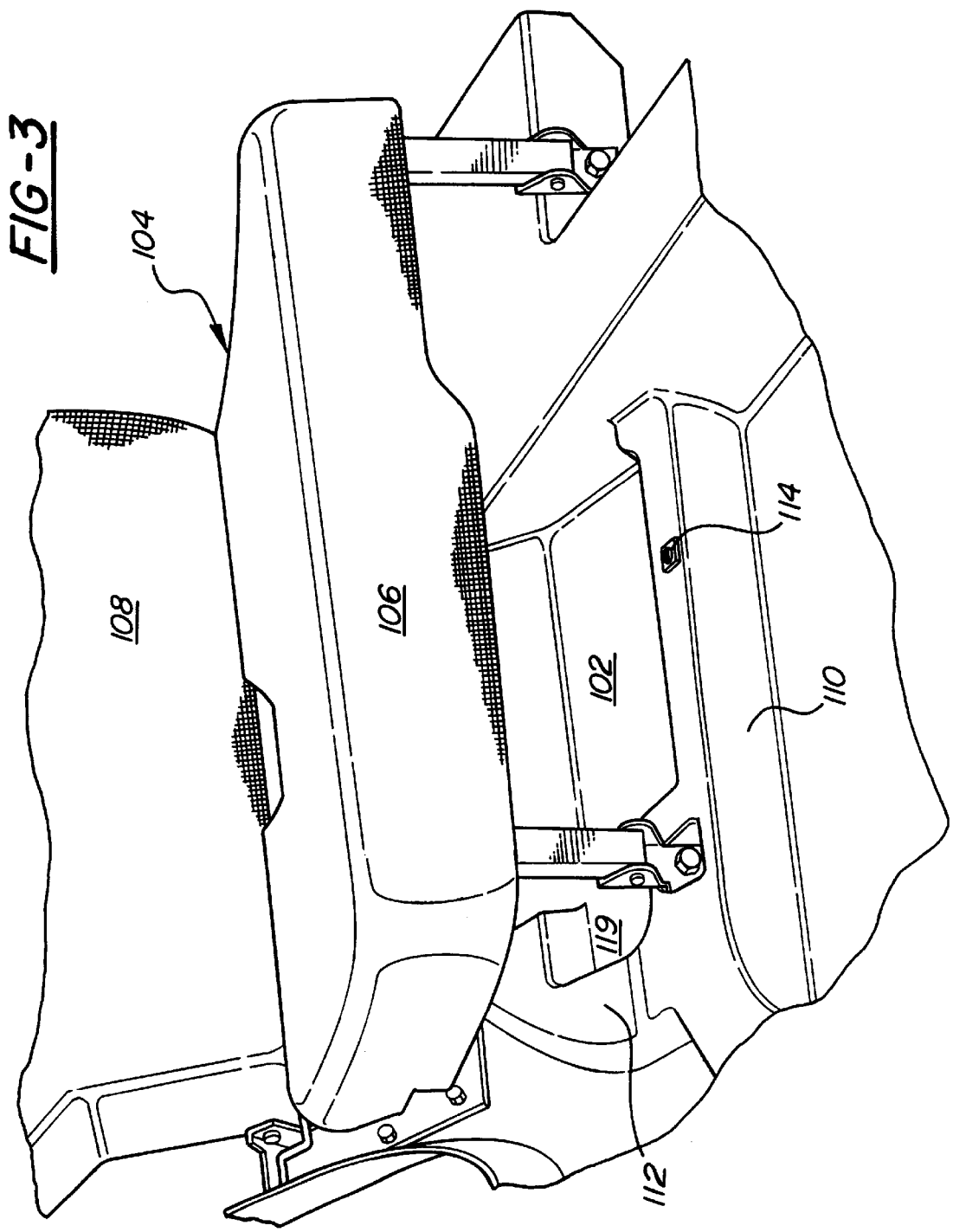

VEHICLE JACK AND TOOL ASSEMBLY

BACKGROUND OF THE INVENTION

1. Technical Field

The present invention relates in general to motor vehicles. More particularly, the present invention relates to a vehicle jack and tool assembly for a motor vehicle. More specifically, but without restriction to the particular embodiment and/or use which is shown and described for purposes of illustration, the present invention relates to a jack and tool system for a motor vehicle that can be selectively removed from the vehicle and transported by the aid of carrying means.

2. Discussion

A conventional automobile includes a variety of tools to use in case of a flat tire. These tools typically include some type of jack, jack handle, wrench, and various other utensils. The jack is used to raise the affected tire off the ground so that it can be removed and a new one, typically the spare in an emergency situation, can be placed thereon. The jack is typically operated by a jack handle. The jack handle is used to raise and lower the jack by movement thereof in a repeating circular or a vertical reciprocating motion. Jack handles often include extensions to allow for ease of operation in certain situations. Other than the jack, the other essential tool is the wrench. The wrench is specifically adapted to remove the lug nuts from the vehicle wheel by circular motion thereof. Although these are the major components of any conventional jack and tool system, other components may be necessary, such as a lock nut wrench a specially adapted wrench to remove select lug nuts that are employed in order to combat tire theft. Another possible component is a pry bar to help to remove tire covers. The specific components of each jack and tool assembly vary depending on the features of the vehicle associated therewith.

The jack and tool assembly is customarily carried in the spare tire compartment or trunk of the motor vehicle. The jack is typically fixedly secured to the vehicle to avoid movement and rattling thereof. The tools are typically placed in a bag or attached to some structure within the spare tire compartment or trunk or the vehicle. The jack and tools are traditionally carried by the operator from the spare tire compartment to the affected tire by removing the jack and tools and transporting them individually. This will typically require more than one trip from the storage area to the affected wheel. Furthermore, many operators neglect to properly return the jack and tools to their intended location. This can cause can noise as the jack and tools may shift during the operation of the vehicle.

One illustrative jack and tool system is embodied in the 1999 Jeep® Grand Cherokee, designed and manufactured by DaimlerChrysler Corporation, the assignee of the present invention. This vehicle locates the vehicle jack in the spare tire compartment in a manner well known in the art. The wrench, jack handle, and various other tools are located below the rear seats and are held by a plurality of clips. To remove the articles necessary to change a flat tire, not only does the operator have to remove the spare tire, he or she has to remove the jack from the spare tire compartment and the various tools from below the rear seat, in total, this could occupy several trips to the affected tire. Not only is it difficult to remove and transfer all of these tools, these design is also susceptible to misplacement of the tools.

Another prior art jack and tool system is disclosed in U.S. Pat. No. 2,649,191 having an issue date of Aug. 18, 1953. This arrangement provides for a unitary location to secure the jack and various tools. However, this arrangement does not alleviate the aforementioned inconvenience of having to make several trips from the tool kit to the affected tire to carry all the necessary tools thereto and therefrom.

U.S. Pat. No. 2,699,865 issued Jan. 18, 1955 discloses a readily portable tool container in which each individual tool is securely held. This disclosure is simply an improvement to the design of a traditional tool box. Although the box carries a jack and wrench, it is not specifically adapted to be carried securely within an automobile. If this disclosed embodiment was placed within a vehicle, it would cause substantial rattling and noise during operation of the vehicle.

There is, therefore, a need to provide a system that can securely fasten a jack and tools to an automotive vehicle while at the same time providing a means to remove and transport the jack and tools without undue inconvenience. There is a further need of to provide means to transport the jack and tools in a safe and effective manner. There is also a need to help minimize the tendency for certain components of the jack and tool assembly being misplaced. It is desirable in addressing the aforementioned needs to provide a highly compact system to realize packaging efficiencies in an industry in which space within the vehicle is at a premium. It is also desirable to provide a lightweight solution to the aforementioned problems and concerns. Additionally, it is also a desire to provide a jack and tool system that can be removed from the vehicle and carried by the use of only one hand.

SUMMARY OF THE INVENTION

Accordingly, it is a principal objective of the present invention to provide a truly unique and exceptionally versatile jack and tool assembly for a motor vehicle.

It is another objective of the present invention to provide a jack and tool assembly that can be removed easily from the vehicle as a unitary structure to reduce unnecessary trips to the affected tire.

It is yet another objective of the present invention to provide a jack and tool assembly that is light and compact that can be transported with ease.

In one form, the present invention provides an apparatus including a body member adapted to receive a lug nut wrench, jack handles, and said jack. The body member includes a handle member for ease of transporting the apparatus and an attachment mechanism for selectively securing said apparatus to the vehicle.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be read in conjunction therewith, and like reference numerals are employed to designate identical components in various views:

FIG. 2 is a perspective view of the jack and tool assembly disposed in a vehicle in the preferred embodiment of the present invention;

FIG. 3 is a perspective view of the vehicle of the first embodiment of the present invention with the jack and tool assembly removed therefrom.

DETAILED DESCRIPTION OF THE PREFERRED EMBODIMENT

Figure 1A:
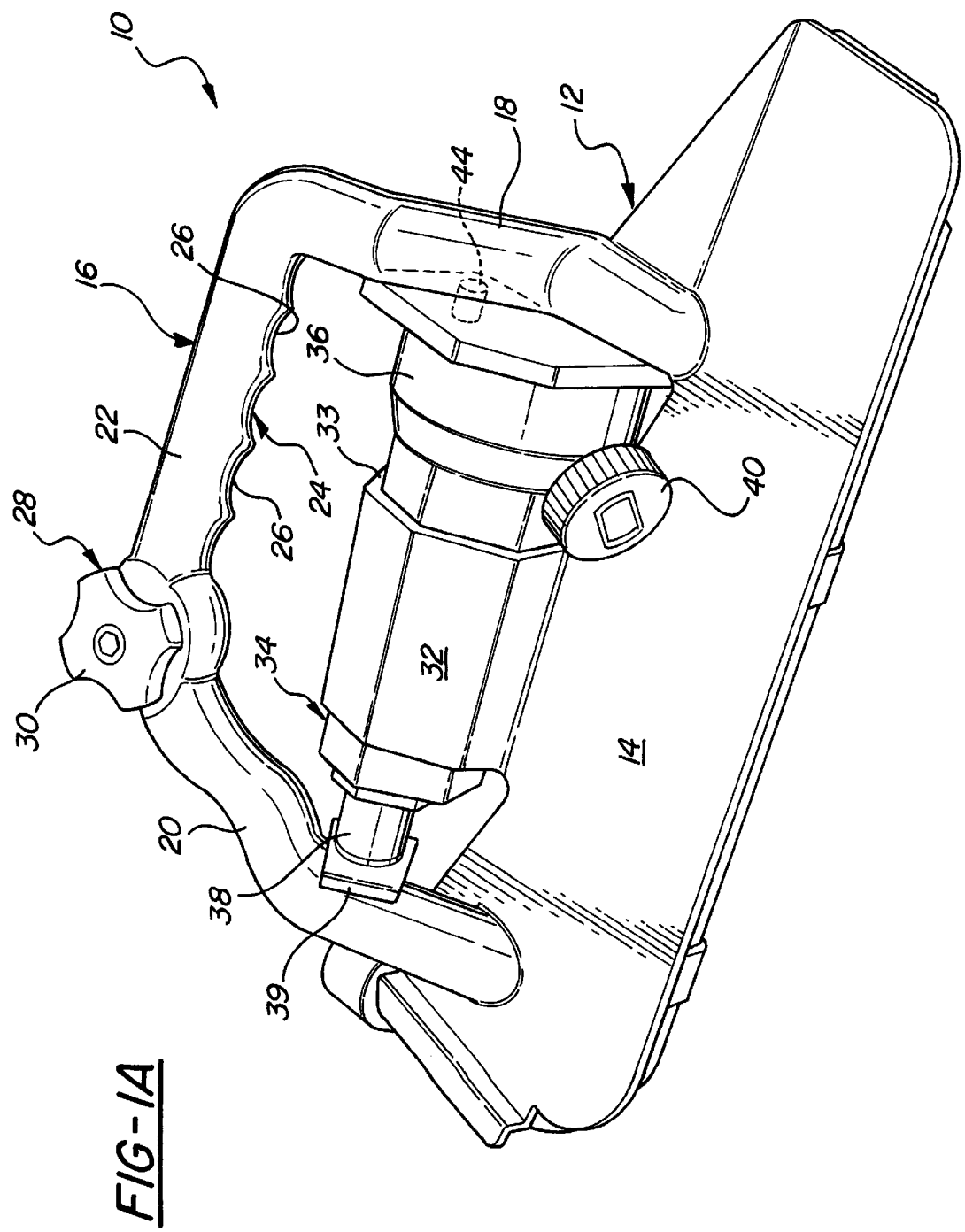
FIG. 1A is a perspective top view of the jack and tool assembly of the present invention.

Referring now to the drawings, there is depicted a jack and tool assembly illustrating the present invention. With reference to FIG. 1A, the jack and tool assembly of the present invention is designated generally by numeral 10. Assembly 10 includes a body member 12 having a generally planar portion 14 and a bracket portion 16. Bracket portion 16 projects from planar portion 14 and forms a U-shaped structure and is formed by supporting members 18 and 20 and a handle member 22 interconnecting members 18 and 20. Supporting members 18, 20 and handle member 22 have, preferably, a generally cylindrical shape associated therewith. Handle member 22 includes a handgrip 24 that is formed by a plurality of depressions 26 therein. Handgrip 24 is adapted for ease of transporting assembly 10. Also included within bracket portion 16 is an attachment mechanism 28. Attachment mechanism 28 includes a knob 30 as shown in FIG. 1 (other salient portions of attachment mechanism 28 will be described subsequently). Knob 30 can be rotated to engage or disengage attachment mechanism 28.

Planar portion 14 includes a generally C-shaped formation 32 extending therefrom and having a free end 33. Formation 32 is adapted to receive a vehicle jack 34 and to locate jack 34 in the proper for and aft position. Jack 34 includes a base structure 36 and a moveable top structure 38 adopted to translate in a vertical fashion from base structure 36 as is well known in the art of screw type jacks. Moveable top structure 38 includes a cradle 39 having a generally planar portion and two upwardly extending flanges 41 (best shown in FIG. 1B) adapted to aid in the placement of said jack onto a vehicles underbody, frame, control arm, or axle. The vertical translation of the top moveable structure 38 is controlled by the rotation of wheel 40 that operate a gear within jack 34. Please see U.S. Pat. No. 5,085,406 for a general description of the wheel of screw jacks. Wheel 40 can be operated by hand to translate the moveable top structure 38 when jack 34 is not bearing any weight thereon, i.e. a car. Rotating wheel 40 while jack 34 is bearing weight will be described subsequently. As the position of jack 34 is located fore and aft by C-shaped formation 32, wheel 40 can be rotated so as to move the moveable top structure 38 upwards, thereby increasing the overall height of the jack 34. Wheel 40 is rotated until the base structure 36 contacts supporting member 18 and the cradle 39 of the moveable top structure 38 contacts supporting member 20. By bridging the distance between supporting members 18 and 20, jack 34 becomes secured in an immobile position. Base member 36 includes a hole 42 formed therein to receive peg 44 that protrudes from a plate 46 extending from supporting structure 18. The arrangement limits rotational motion of jack 34. The bridging of the jack 34 between supporting structure 18 and 20 limits transverse motion of the jack and c-shaped formation 32 in connection with the bridging arrangement limits fore and aft movement of jack 34, thereby providing jack 34 in a secured and immobile position.

Figure 1B:
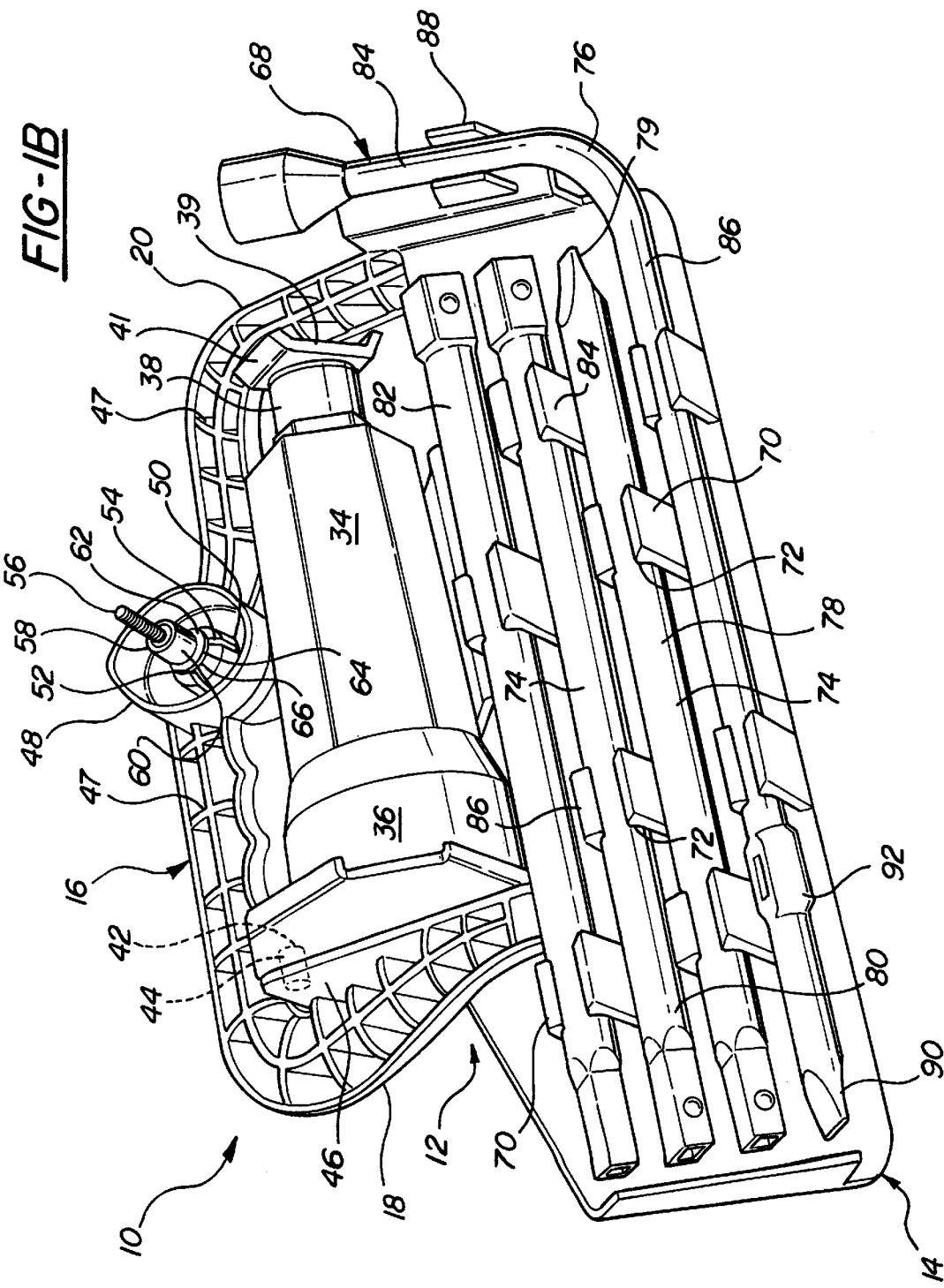
FIG. 1B is a perspective bottom view of the jack and tool assembly of the present invention.

Turning to FIG. 1B, a bottom perspective view of the jack and tool assembly 10 of the present application is provided. Bracket portion 16 includes a plurality of ribs 47 that act to strengthen the supporting members 18, 20 and the handle member 22 while reducing unnecessary weight. Attachment mechanism 28 is rotatably coupled to body member 12. Body member 12 includes a hemispherically shaped pedestal 48 with the knob 30 operatively connected to the convex side thereof. Pedestal 48 includes an aperture 50 formed therethrough. Aperture 50 is circumscribed by a flange 52 that extends from the concave side of pedestal 48. Aperture 50 is formed in a curved funnel-like manner such that flange 52 creates the smallest diameter of the aperture 50. Flange 52 includes a plurality of slots 54 formed therein. Knob 30 includes a screw 56 extending therefrom. Although in the preferred embodiment of the present invention the attachment mechanism 28 includes a knob a screw 56, it should be appreciated that one skilled in the art could conceive of various attachment mechanisms that can be used to attach assembly 10 to a vehicle. Methods such as clips, magnets, and many other mechanisms are clearly within the scope of the present invention.

Screw 56 also includes a cap 58 attached thereto. Cap 58 includes a generally cylindrical portion 60 and an angled clip portion 62. During installation, screw 56 is inserted through aperture 50. Cylindrical portion 60 is sized so as to allows passage through aperture 50 as well. Angled clip portion 62 has a larger circumference than cylindrical portion 60 and when inserted into aperture 50 contacts flange 52. Flange 52, with the aid of slots 54 formed therein, bends outward away from aperture 50 as flange 52 is in contact with angled clip portion 62. Angled clip portion 62 increases in diameter from cylindrical portion 60 to its end 66 where its diameter is substantially reduced. As insertion continues, the edge 64 of flange 52 reaches the end 66 of clip portion 62. After edge 64 passes end 66, flange 52 resiles providing a locking arrangement between the attachment mechanism 28 and pedestal 48. It should be appreciated that both knob 30 and clip portion 62 have diameters larger than the diameter of aperture 50 and that knob 30 and screw 56 are formed to cooperatively rotate within aperture 50.

Body member 12 includes planar portion 14 that is adapted to cover and to receive a plurality of tools 68. Planar portion 14 includes a plurality of positioning clips 70. In the preferred embodiment, each positioning clip 70 projects from planar portion 14 in a cantilevered fashion. Clips 70 have a slightly enlarged distal edge 72 to aid is received tools 68. Tools 68 include a lug nut wrench 76, a first jack handle 78, a second jack handle 80, and a third jack handle 82. Each tool 68 has a generally cylindrical body formation 74 that can be inserted between clips 70. For example, as second jack handle 80 is inserted between clips 84 and 86, clips 84 and 86 are forced outward. As second jack handle 80 passes enlarged distal edge 72, clips 84 and 86 resile and consequently second jack handle 80 is held in relation to planar portion 14 of body member 12. It should be appreciated that removing a tool 68 is simply the reverse of the insertion process described hereinabove.

The jack handles 78, 80, 82 are generally straight in construction and, when held by said body member 12 extend along the planar portion 14 thereof. However, lug nut wrench 76 has a socket structure 84 and a handle structure 86 formed at substantially a right angle from each other. Handle structure 86 positioned in a similar manner to handles 78, 80 and 82. Once handle structure 86 is positioned socket structure 84 is rotatable thereabout and can be inserted in clips 88 to prevent this rotational motion. Handle structure 86 includes a pry end 90 and a handle attachment 92 as is well known in the art. It should be appreciated that although only the preferred embodiment of the present invention is described herein in detail, there are various ways to couple tools 68 to body member 12. Clips 70 are preferable, but other methods could include various types of mechanical attachments as well as the use of magnets to couple tools 68 to body member 12.

When jack 34 is positioned to raise a vehicle, moveable top portion 38 can only be raised with hand rotation of wheel 40 until sufficient weight is imparted thereon. To raise moveable top portion 38, handle assembly can be used. Handle assembly is constructed in the following manner: (1) first jack handle 78 having an end 79 adapted for insertion into wheel 40 of jack 34, (2) second jack handle 80 coupled to first jack handle 78, (3) third jack handle 82 couple to second jack handle, and (4) lug nut wrench 76 attached to third jack handle 82 via handle attachment 92. The coupling attachments formed between the various members of the handle assembly can be construction in a number of ways well known in the art, such as clips, screws, or insertion fittings. Handle assembly is used to provide greater force and leverage upon wheel 40 in the preferred embodiment of the present invention to raise the moveable top structure 38. It should be appreciated that various types of jacks and operating systems can be used within the scope and teachings of the present inventions as defined by the accompanying claims.

Turning to FIG. 2, jack and tool assembly 10 is illustrated disposed within a vehicle 100. Vehicle 100 includes floor 102 and rear seat 104 including a seat cushion 106 and a seat back 108. Floor 102 includes a front support structure 110 protruding therefrom and a side support 112 also protruding therefrom. Front support 110 includes a threaded bore 114 (shown in FIG. 4) formed therein for reception of screw 56 of attachment mechanism 28. Engagement and disengagement between screw 56 and bore 114 is facilitated by rotating knob 30 that is operatively attached to screw 56. Attachment of screw 56 and floor 102 limits longitudinal and lateral movement of the assembly 10, however, this attachment does not prevent rotational movement of assembly about screw 56. Rotational movement is restricted by both front support 110 and side support 112. Side support 112 includes a recess 119 adapted to receive a portion 120 of assembly 10. It should be appreciated that any structure adopted to limit rotational movement of assembly 10 would be within the scope of the present invention. It should also be appreciated that assembly 10 can be accessed easily while still being substantially concealed from sight, this concealment is attributed to the assembly 10 being disposed underneath rear seat 104. Rear seat 104 in the present invention can be translated to a variety of various positions, all of which still act to substantially conceal assembly 10. It should be appreciated that many translations of the seat 104 can be used in conjunction with the present invention. For example, if the access area 117 underneath seat 104 is too small, i.e. seat 104 is too close to the floor 102, seat 104 could be adapted to move to allow proper access to assembly 10. More specifically, cushion 106 could pivot about a point whereby cushion 106 can rotate about its front edge to create access to assembly 10 vertically as opposed to through substantially horizontal access through area 117 in the preferred embodiment of the present invention.

Figure 4:
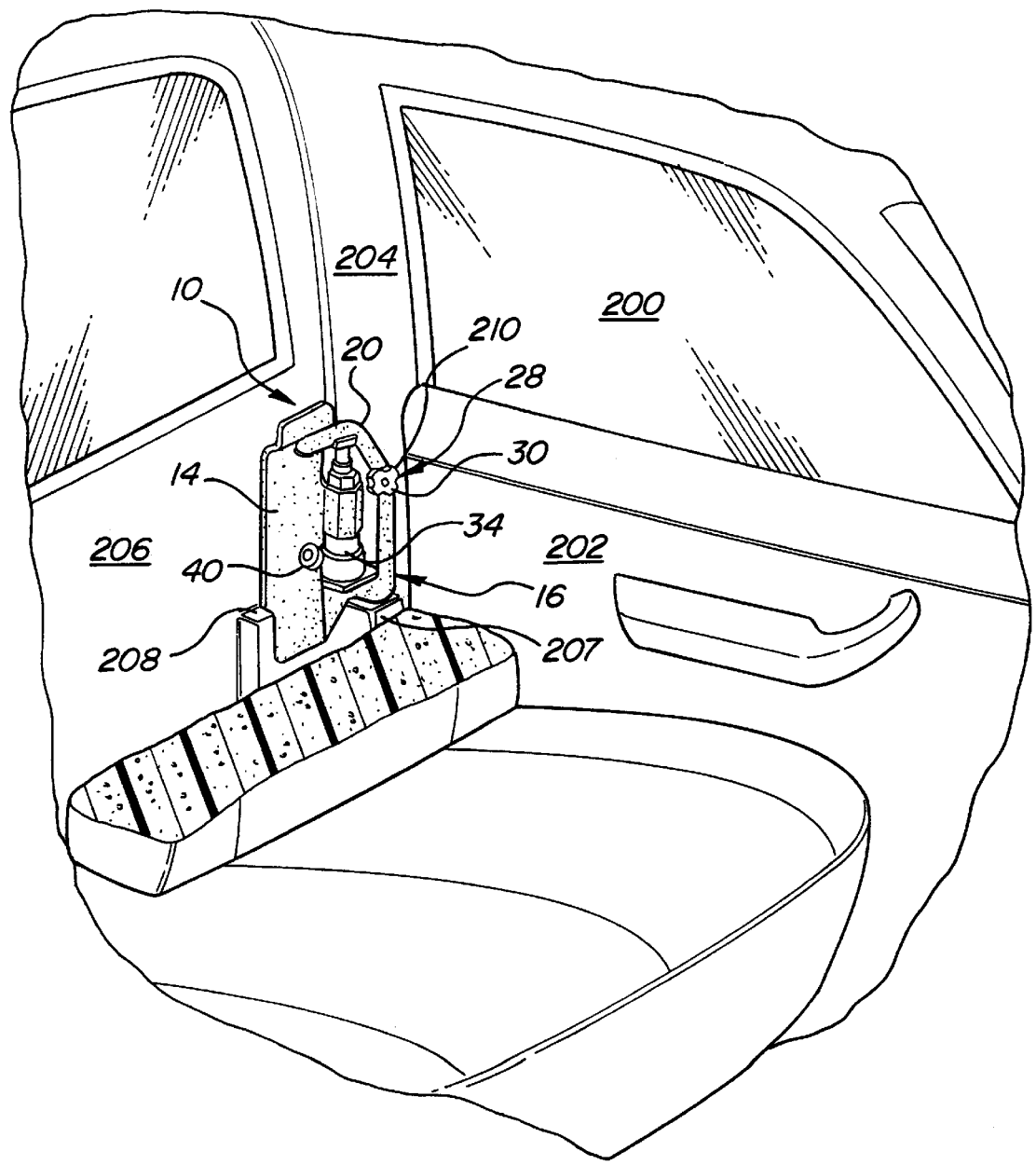
FIG. 4 is perspective view of the jack and tool assembly disposed in a vehicle in an alternate embodiment of the present invention.

Another possible placement of assembly 10 is illustrated in FIG. 4. This alternative embodiment of the present invention includes a vehicle cab 200. Cab 200 is preferably a pick up truck cab that includes a door 202, quarter wall 204 and a rear wall 206. Quarter wall 204 includes a threaded bore 210 to receive screw 56 of assembly. When screw 56 of attachment mechanism 28 is engaged with bore 210 and therefore rotatably coupled to quarter wall 204. A raised formation 207 is formed protruding from quarter wall 204 that is adapted to contact bracket portion 16 of assembly 10. Another raised formation 208 is formed protruding from back rear wall 206 that is adapted to cooperate with formation 207 to limit rotational movement of assembly 10, while screw 56 is engaged with bore 210.

While the above description constitutes the preferred embodiment of the invention, it will be appreciated that the invention is susceptible to modification, variation, and change without departing from the proper scope or fair meaning of the accompanying claims.

What is claimed is:

1. An apparatus for use associated with a motor vehicle adapted to carry a vehicle jack and various tools, said apparatus comprising:

a body member adapted to receive said tools and said jack, said body member including a handle member for ease of transporting said apparatus and an attachment mechanism for selectively securing said apparatus to the vehicle, said jack having a height and being capable of increasing and decreasing said height, said body member includes a pair of opposing support members interconnected by said handle member creating a gap therebetween, said gap adapted to receive said jack, said jack capable of increasing said height so as to contact said pair of supporting members to create an immobile position of said jack.

2. The apparatus as set forth in claim 1, wherein one of said pair of opposing support members includes a peg to cooperate with said jack to properly align said jack between said pair of opposing support members.

3. The apparatus as set forth in claim 1, wherein said jack is a screw jack.

4. The apparatus as set forth in claim 1, wherein said attachment mechanism includes a knob having a screw extending therefrom rotatably coupled to said body member.

5. The apparatus as set forth in claim 4, wherein said body member includes an aperture formed therein for reception of said attachment mechanism.

6. The apparatus as set forth in claim 5, wherein said body member includes a flange circumscribing said aperture, said flange having a plurality of slots, said screw includes a cap adapted to cooperate with said flange and said knob to rotatably couple said attachment mechanism to said body member.

7. The apparatus as set forth in claim 1, wherein said handle member includes a handgrip.

8. The apparatus as set forth in claim 7, wherein said handgrip includes a plurality of depressions.

9. The apparatus as set forth in claim 1, wherein said body member includes a planar structure adapted to receive said tools.

10. The apparatus as set forth in claim 9, wherein said planar structure includes a plurality of clips adapted to secure said tools thereto.

11. The apparatus as set forth in claim 10, wherein said plurality of clips project from said planar structure in a cantilevered fashion and includes an enlarged distal edge.

12. An apparatus for use associated with a motor vehicle adapted to carry a vehicle jack, a lug nut wrench, and at least one jack handle, said apparatus comprising:

a body member including a first and second supporting member and a handle member interconnecting said first and second supporting member, and first and second supporting members adapted to receive said jack therebetween, said handle member adapted to facilitate transportation of said apparatus;

an attachment mechanism carried by and rotatably coupled to said body member and adapted to selectively secure said apparatus to said vehicle.

13. The apparatus as set forth in claim 12, wherein said handle member includes a handgrip formed by a plurality of depressions.

14. The apparatus as set forth in claim 12, wherein said attachment mechanism is comprised of a knob having a screw extending therefrom, said attachment mechanism adapted to be received by an aperture formed in said body member.

15. The apparatus as set forth in claim 14, wherein said screw is adapted to be received by a mating bore in said vehicle.

16. The apparatus as set forth in claim 15, wherein said body member is restricted from rotating about said attachment mechanism by a mating formation of said vehicle.

17. An apparatus for use associated with a motor vehicle adapted to carry a vehicle jack, a lug nut wrench, and at least one jack handle, said apparatus comprising:

a planar structure having a plurality of clips extending therefrom, said clips adapted to secure said lug nut wrench and said at least one jack handle;

a first supporting member extending from said planar structure;

a second supporting member extending from said planar structure;

a handle member interconnecting said first and second supporting members, said handle member including a hand grip with a plurality of depression to facilitate transportation of said apparatus; and an attachment mechanism associated with said handle mechanism to selectively secure said apparatus to said motor vehicle.

18. An apparatus for use associated with a motor vehicle adapted to carry a vehicle jack and various tools, said motor vehicle including a floor and a plurality of seats, said apparatus comprising:

a body member adapted to receive said tools and said jack, said body member including a handle member for ease of transporting said apparatus and an attachment mechanism for selectively securing said apparatus to the vehicle, said body member capable of being secured to the floor of said vehicle, wherein said attachment mechanism includes a knob having a screw extending therefrom carried by and rotatably coupled to said body member, said screw adapted to be received by a threaded bore formed in the floor of said vehicle.

19. The apparatus as set forth in claim 18, wherein said body member is capable of being to secured to said floor underneath one of said plurality of vehicle seats.

20. The apparatus as set forth in claim 19, wherein said floor includes a formation protruding therefrom to contact said apparatus and limit rotational movement thereof while said screw is received by said threaded bore.

21. An apparatus for use associated with a motor vehicle adapted to carry a vehicle jack and various tools, said motor vehicle including a door, a floor, and a wall, said apparatus comprising:

a body member adapted to receive said tools and said jack, said body member including a handle member for ease of transporting said apparatus and an attachment mechanism for selectively securing said apparatus to the vehicle, said body member capable of being secured to the vehicle to said wall, wherein said attachment mechanism includes a knob having a screw extending therefrom carried by and rotatably coupled to said body member, said screw adapted to be received by a threaded bore formed in said wall of said vehicle.

22. The apparatus as set forth in claim 21, wherein said wall includes a formation protruding therefrom to contact said apparatus and limit rotational movement thereof while said screw is received by said threaded bore.

* * * * *